(12) United States Patent
Liu et al.

(10) Patent No.: US 8,375,204 B2
(45) Date of Patent: Feb. 12, 2013

(54) METHOD AND SYSTEM TO COMBINE MULTIPLE DIGITAL CERTIFICATES USING THE SUBJECT ALTERNATIVE NAME EXTENSION

(75) Inventors: Quentin Liu, San Jose, CA (US); Marc Williams, San Jose, CA (US); Richard F. Andrews, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 393 days.

(21) Appl. No.: 12/639,765

(22) Filed: Dec. 16, 2009

(65) Prior Publication Data

US 2011/0145567 A1 Jun. 16, 2011

(51) Int. Cl.
*H04L 9/32* (2006.01)
(52) U.S. Cl. .................................... 713/156; 713/175
(58) Field of Classification Search .............. 713/156, 713/157, 175
See application file for complete search history.

(56) References Cited

U.S. PATENT DOCUMENTS

| | | | |
|---|---|---|---|
| 6,085,320 A | 7/2000 | Kaliski, Jr. | |
| 6,978,364 B1 * | 12/2005 | Balaz et al. | 713/153 |
| 6,990,684 B2 * | 1/2006 | Futamura et al. | 726/18 |
| 7,131,003 B2 | 10/2006 | Lord et al. | |
| 7,409,553 B2 | 8/2008 | Kumagai et al. | |
| 7,774,599 B2 | 8/2010 | Guo et al. | |
| 8,135,950 B2 * | 3/2012 | Parkinson | 713/156 |
| 2002/0108042 A1 | 8/2002 | Oka et al. | |
| 2003/0126431 A1 | 7/2003 | Beattie et al. | |
| 2004/0177246 A1 | 9/2004 | Balaz et al. | |
| 2005/0114653 A1 | 5/2005 | Sudia | |
| 2005/0287990 A1 | 12/2005 | Mononen et al. | |
| 2006/0129804 A1 | 6/2006 | Satkunanathan et al. | |
| 2006/0265508 A1 | 11/2006 | Angel et al. | |
| 2007/0101125 A1 | 5/2007 | Lain et al. | |
| 2008/0209208 A1 | 8/2008 | Parkinson | |
| 2008/0228651 A1 | 9/2008 | Tapsell | |
| 2009/0092247 A1 | 4/2009 | Kido et al. | |
| 2009/0132812 A1 | 5/2009 | Kobozev et al. | |
| 2010/0048296 A1 | 2/2010 | Adiraju | |
| 2010/0185864 A1 * | 7/2010 | Gerdes et al. | 713/175 |

(Continued)

FOREIGN PATENT DOCUMENTS

JP 2008-042753 2/2008

OTHER PUBLICATIONS

"Public key certificate"—Wikipedia Entry, retrieved from the Internet: <<http://en.wikipedia.org/wiki/Public_key_certificate>>, 5 pages total, Feb. 2010.

(Continued)

*Primary Examiner* — Zachary A Davis
(74) *Attorney, Agent, or Firm* — Lowenstein Sandler LLP (57) ABSTRACT

A method for forming a digital certificate includes receiving contact information associated with the digital certificate. The contact information includes at least a name, a mailing address, and an email address. The method also includes receiving billing information associated with the digital certificate and receiving a Certificate Signing Request (CSR) for the digital certificate. The method further includes receiving a first name for use in forming the digital certificate and receiving a second name for use in forming the digital certificate. Moreover, the method includes receiving an indication of a vendor of web server software, receiving an indication of a service period for the digital certificate, and forming the digital certificate. The first name is stored in a Subject field of the digital certificate and the second name is stored in the SubjectAltName extension of the digital certificate.

16 Claims, 5 Drawing Sheets

U.S. PATENT DOCUMENTS

2011/0145569 A1 6/2011 Liu et al.

OTHER PUBLICATIONS

"Using Subject Altname," [Online Discussion Board], retrieved from the Internet: <<http://www.issociate.de/board/22008/Using_subjectAltName.html>>, 3 pages, Oct. 2002.

Cooper et al., RFC 5280—"Internet X.509 Public Key Infrastructure Certificate and Certificate Revocation List (CRL) Profile" The IETF Trust (2008), retrieved from the Internet: <<http://www.ietf.org/rfc/rfc5280.txt>>, 141 pages.

Helm and Mugaratham, "SubjectAltNames in X.509 Certificates," version 8, Aug. 2004, retrieved from the Internet: <<http://www.es.net/pub/esnet-doc/SubjectAltName.pdf>>, 6 pages total.

USPTO; Office Action for U.S. Appl. No. 12/639,771, mailed Jul. 13, 2012.

\* cited by examiner

METHOD AND SYSTEM TO COMBINE MULTIPLE DIGITAL CERTIFICATES USING THE SUBJECT ALTERNATIVE NAME EXTENSION

CROSS-REFERENCES TO RELATED APPLICATIONS

Pending U.S. Patent Application Ser. No. 12/639,771, filed Dec. 16, 2009, and entitled "Method and system for provisioning multiple digital certificates," is incorporated herein by reference.

BACKGROUND OF THE INVENTION

X.509 certificates, also referred to as digital certificates, are used in a wide variety of applications. These digital certificates provide a method to verify the identity of a user, are a component of a secure communications channel, and deliver authentication information based on these capabilities.

X.509 certificates are defined by the Telecommunication Standardization Sector (ITU-T) of the International Telecommunication Union (ITU) as part of the Directory (X.500) series.

The structure of an X.509 v3 digital certificate is as follows:
Certificate
  Version
  Serial Number
  Algorithm ID
  Issuer
  Validity
    Not Before
    Not After
  Subject
  Subject Public Key Info
    Public Key Algorithm
    Subject Public Key
  Issuer Unique Identifier (Optional)
  Subject Unique Identifier (Optional)
  Extensions (Optional)
    . . .
Certificate Signature Algorithm
Certificate Signature X.509 certificates bind the name of an entity in the real world, such as a company "VeriSign," to a public key. The "Subject" field of the certificate provides a location for storage of the name, which is bound to the public key stored in the certificate. The subject name is in the form of an X.500 or LDAP directory name and is often identical to the entity's directory name, e.g., the fully qualified domain name of the website: www.verisign.com. Because of this close association, the X.509 certificate's Subject name is often referred to as the distinguished name. Many digital certificates contain only one name, which is stored in the Subject field.

Starting with X.509 v3 certificates, the subject alternative name extension was provided to allow identities to be bound to the subject of the certificate. These identities may be included in addition to or in place of the identity in the subject field of the certificate. Defined options include an Internet electronic mail address, a DNS name, an IP address, or a Uniform Resource Identifier (URI).

Despite the benefits available through the use of digital certificates, there is a need in the art for improved methods and systems related to the use of digital certificates.

SUMMARY OF THE INVENTION

The present invention relates generally to computer networks. More specifically, the present invention relates to methods and systems for managing digital certificates. Merely by way of example, the invention has been applied to a method of combining multiple digital certificates using the SubjectAltName extension. In a particular embodiment, a combined certificate is formed from two existing digital certificates, with the name in the Subject field of the first certificate stored in the Subject field of the combined certificate and the name in the Subject field of the second certificate stored as the name in the SubjectAltName extension of the combined certificate. In another particular embodiment, a new certificate is provisioned with a first domain name stored in the Subject field of the new certificate and a second domain name stored in the SubjectAltName extension of the new certificate. A single public key is used for both domain names. The methods and techniques can be applied to a variety of computer networks and communications systems.

According to an embodiment of the present invention, a method for forming a digital certificate is provided. The method includes receiving contact information associated with the digital certificate. The contact information includes at least a name, a mailing address, and an email address. The method also includes receiving billing information associated with the digital certificate, receiving a Certificate Signing Request (CSR) for the digital certificate, receiving a first name for use in forming the digital certificate, and receiving a second name for use in forming the digital certificate. The method further includes receiving an indication of a vendor of web server software, receiving an indication of a service period for the digital certificate, and forming the digital certificate. The first name is stored in a Subject field of the digital certificate and the second name is stored in the SubjectAltName extension of the digital certificate.

According to another embodiment of the present invention, a method for combining a first certificate and a second certificate into a combined certificate is provided. The method includes receiving information from a user related to the first certificate having a Subject field including a first name and receiving a request from the user to combine the first certificate into the combined certificate. The method also includes receiving information from the user related to the second certificate having a Subject field including a second name and receiving a request from the user to combine the second certificate into the combined certificate. The method further includes forming the combined certificate. The first name is stored in the Subject field of the combined certificate and the second name is stored in a SubjectAltName extension of the combined certificate.

According to yet another embodiment of the present invention, a method of forming a combined digital certificate is provided. The method includes receiving information from a user and receiving a Certificate Signing Request (CSR) for the combined digital certificate. The method also includes receiving a first name for use with the combined digital certificate and receiving a second name for use with the combined digital certificate. The method further includes issuing the combined digital certificate having the first name carried in the common name of the Subject field of the combined certificate and the second name carried in the SubjectAltName extension of the combined digital certificate.

According to a specific embodiment of the present invention, a method of combining a plurality of digital certificates into a combined certificate is provided. The method includes receiving an indication to combine a first certificate and receiving an indication to combine a second certificate. The method also includes displaying a first set of one or more names associated with the Subject field or the SubjectAltName extension of the first certificate and displaying a second set of one or more names associated with the Subject field or the SubjectAltName extension of the second certificate. The method further includes receiving a selection of a master name from the first set of one or more names, receiving a selection of an alternate name from at least one of the first set of one or more names or the second set of one or more names, and forming the combined certificate with the master name in the Subject field of the combined certificate and the alternate name in the SubjectAltName extension of the combined certificate.

According to another specific embodiment of the present invention, a system for forming a digital certificate is provided. The system includes a data processor, a communications module coupled to the data processor, and a computer readable medium coupled to the data processor and storing a plurality of instructions for controlling the data processor to form the digital certificate. The plurality of instructions include instructions that cause the data processor to receive contact information associated with the digital certificate. The contact information includes at least a name, a mailing address, and an email address. The plurality of instructions also include instructions that cause the data processor to receive billing information associated with the digital certificate, receive a Certificate Signing Request (CSR) for the digital certificate, receive a first name for use in forming the digital certificate, and receive a second name for use in forming the digital certificate. The plurality of instructions further include instructions that cause the data processor to receive an indication of a vendor of web server software, receive an indication of a service period for the digital certificate, and form the digital certificate. The first name is stored in a Subject field of the digital certificate and the second name is stored in the SubjectAltName extension of the digital certificate.

According to yet another specific embodiment of the present invention, a system for combining a first certificate and a second certificate into a combined certificate is provided. The system includes a data processor, a communications module coupled to the data processor, and a computer readable medium coupled to the data processor and storing a plurality of instructions for controlling the data processor to combine the first certificate and the second certificate into the combined certificate. The plurality of instructions include instructions that cause the data processor to receive information from a user related to the first certificate having a Subject field including a first name and receive a request from the user to combine the first certificate into the combined certificate. The plurality of instructions also include instructions that cause the data processor to receive information from the user related to the second certificate having a Subject field including a second name and receive a request from the user to combine the second certificate into the combined certificate. The plurality of instructions further include instructions that cause the data processor to form the combined certificate. The first name is stored in the Subject field of the combined certificate and the second name is stored in a SubjectAltName extension of the combined certificate.

According to a particular embodiment of the present invention, a system for forming a combined digital certificate is provided. The system includes a data processor, a communications module coupled to the data processor, and a computer readable medium coupled to the data processor and storing a plurality of instructions for controlling the data processor to form the combined digital certificate. The plurality of instructions include instructions that cause the data processor to receive information from a user and receive a Certificate Signing Request (CSR) for the combined digital certificate. The plurality of instructions also include instructions that cause the data processor to receive a first name for use with the combined digital certificate and receive a second name for use with the combined digital certificate. The plurality of instructions further include instructions that cause the data processor to issue the combined digital certificate having the first name carried in the common name of the Subject field of the combined digital certificate and the second name carried in the SubjectAltName extension of the combined digital certificate.

According to another particular embodiment of the present invention, a system for combining a plurality of digital certificates into a combined certificate is provided. The system includes a data processor, a communications module coupled to the data processor, and a computer readable medium coupled to the data processor and storing a plurality of instructions for controlling the data processor to combine the plurality of digital certificates into the combined certificate. The plurality of instructions include instructions that cause the data processor to receive an indication to combine a first certificate and receive an indication to combine a second certificate. The plurality of instructions also include instructions that cause the data processor to display a first set of one or more names associated with the Subject field or the SubjectAltName extension of the first certificate and display a second set of one or more names associated with the Subject field or the SubjectAltName extension of the second certificate. The plurality of instructions further include instructions that cause the data processor to receive a selection of a master name from the first set of one or more names, receive a selection of an alternate name from at least one of the first set of one or more names or the second set of one or more names, and form the combined certificate with the master name in the Subject field of the combined certificate and the alternate name in the SubjectAltName extension of the combined certificate.

Numerous benefits are achieved by way of the present invention over conventional techniques. For example, embodiments of the present invention provide an owner of digital certificates with the ability to combine multiple digital certificates into a certificate with a single private key. The combined certificate can be used on any server whose name is stored in the certificate. Thus, the user does not have to keep track of which certificate belongs on which server. Another advantage provided by the combined certificate is that one certificate and the associated public/private key pair is typically easier to manage than multiple certificates, each with their own private key. Thus, embodiments of the present invention reduce the administrative burden for certificate owners and managers.

Additionally, embodiments of the present invention provide a certificate manager with greater flexibility in configuring certificates with multiple names. For example, CAs implementing embodiments of the present invention can offer many different ways to choose the common name stored in the Subject field of the combined certificate and the public key to be used in the combined certificate. Thus, embodiments of the present invention provide greater flexibility in building the combined certificate according to the user's specifications and desires. These and other embodiments of the invention along with many of its advantages and features are described in more detail in conjunction with the text below and attached figures.

DETAILED DESCRIPTION OF SPECIFIC EMBODIMENTS

Embodiments of the present invention relate to methods and systems for providing digital certificates with multiple names. In a first embodiment, a Certificate Authority (CA) can provide a combined certificate to purchasers as part of the initial certificate purchase process. The certificate purchase process is also referred to as a certificate enrollment process or a certificate provisioning process. In a second embodiment, several certificates are combined to form a combined certificate using a "Combine" feature that is offered to existing certificate holders. Other embodiments are also described herein.

According to embodiments of the present invention, the SubjectAltName extension provided by the certificate is used to store one or more names, for example, email addresses, additional domain names, or the like. As an example, the digital certificate containing www.verisign.com in the Subject field could also include additional website addresses such as www.thawte.com and www.geotrust.com in the SubjectAltName extension. The advantage of a digital certificate with multiple names (referred to herein as a combined certificate) is that the same certificate and associated private key can be used on physical web servers that serve any of the three names. Thus, the workload of a person administering the certificates is reduced by some embodiments of the present invention.

In a conventional certificate issuing system, certificate users purchase a certificate for each name. For the example given above, the user would purchase three certificates. As a result, the process of purchasing multiple certificates and managing these multiple certificates may be burdensome to the user. Embodiments of the present invention provide methods and systems that a CA can use to combine multiple certificates that have been provisioned to a single user. In one embodiment, the names in the Subject fields of the certificates (also referred to as the CommonName or common name field) will be used in the provisioning of the new combined certificate.

Figure 1:
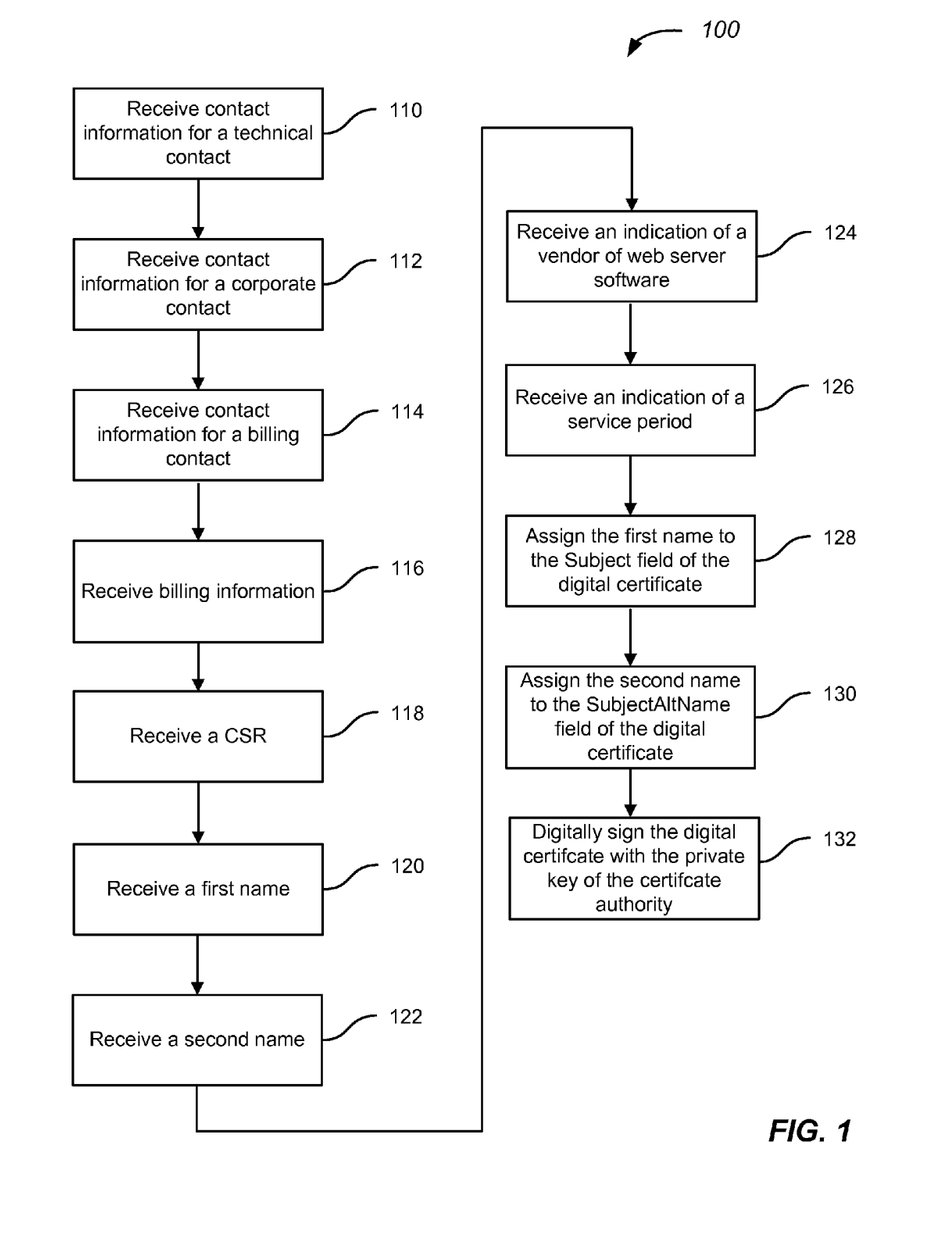
FIG. 1 is a simplified flowchart of a certificate enrollment process according to an embodiment of the present invention.

FIG. 1 is a simplified flowchart of a certificate enrollment process according to an embodiment of the present invention. In the certificate enrollment process illustrated in FIG. 1 (also referred to as a certificate provisioning process), a user provides multiple names that should be included in a single certificate. As part of the certificate enrollment process for the combined certificate, the user provides, and the CA receives, contact and billing information. Additionally, the CA receives a Certificate Signing Request (CSR) for the combined certificate.

In public key infrastructure systems, a CSR, also referred to as a certification request, is a message sent from an applicant to a CA in order to apply for a digital identity certificate. Before creating a CSR, the applicant first generates a public/private key pair, keeping the private key secret. The CSR contains information identifying the applicant, such as a website that can be used as the common name (CN) of the Subject field in an X.509 certificate. The distinguished name will typically include a common name plus other fields such as Organization, Organizational Unit, City, State, Country, and the like. The public key chosen by the applicant is included in the CSR and the private key is used to digitally sign the CSR.

According to embodiments of the present invention, the user will provide a first name, which will be stored in the common name portion of the Subject field and a second name, which will be stored in the SubjectAltName extension of the combined certificate. The combined certificate will be issued with a single public key used for both names. As explained more fully throughout the present specification, this concept is extendable to the storage of additional names in the SubjectAltName extension, for example, two names, three names, four names, or more names. One of ordinary skill in the art would recognize many variations, modifications, and alternatives.

In a particular embodiment, the method of provisioning a certificate 100 includes receiving contact information for a technical contact associated with the digital certificate (110). The contact information can include the name of a technical contact person, a mailing address, one or more phone numbers, an email address, or the like. Contact information is also received for a corporate contact (112) and a billing contact (114). In some embodiments, a contact person may act in multiple roles, for example, as a corporate and billing contact point for the applicant. Billing information associated with the digital certificate is also received from the applicant (116). The billing information can include a method of payment and payment details for the purchase of the certificate. Other information related to payment for the certificate can also be provided. In other embodiments, less contact information is received and utilized in performing the methods described herein. Thus, the present invention is not limited to the particular contact information discussed in relation to FIG. 1.

A CSR for the digital certificate is received by the certificate provisioning system (118). In this embodiment, the CSR will include a name that will be used as the common name for the Subject field of the certificate, which can be referred to as a first name (120). A second name is also received (122) that will be used in forming the digital certificate. Additionally, the method includes receiving an indication of a vendor of web server software (124) and receiving an indication of a service period for the digital certificate (126). Examples of service periods are one year, two years, and the like.

The certificate provisioning system forms the digital certificate with the first name stored or carried in the Subject field of the digital certificate (128) and the second name stored or carried in the SubjectAltName extension of the digital certificate (130). The CA digitally signs the digital certificate with the private key of the CA (132). Thus, the applicant receives a completed digital certificate with one name, which may be referred to as a master name, stored in the Subject field of the certificate as the common name and one or more names stored in the SubjectAltName extension of the certificate.

According to an alternative embodiment, the method further includes receiving a third name for use in forming the digital certificate. The third name will be stored in the SubjectAltName extension of the digital certificate along with the second name. Thus, embodiments of the present invention provide certificates that can be used on more than two servers since more than two names (in this example, three names) can be stored in the certificate by using the Subject field and the SubjectAltName extension.

It should be appreciated that the specific steps illustrated in FIG. 1 provide a particular method of performing a certificate enrollment process according to an embodiment of the present invention. Other sequences of steps may also be performed according to alternative embodiments. For example, alternative embodiments of the present invention may perform the steps outlined above in a different order. Moreover, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
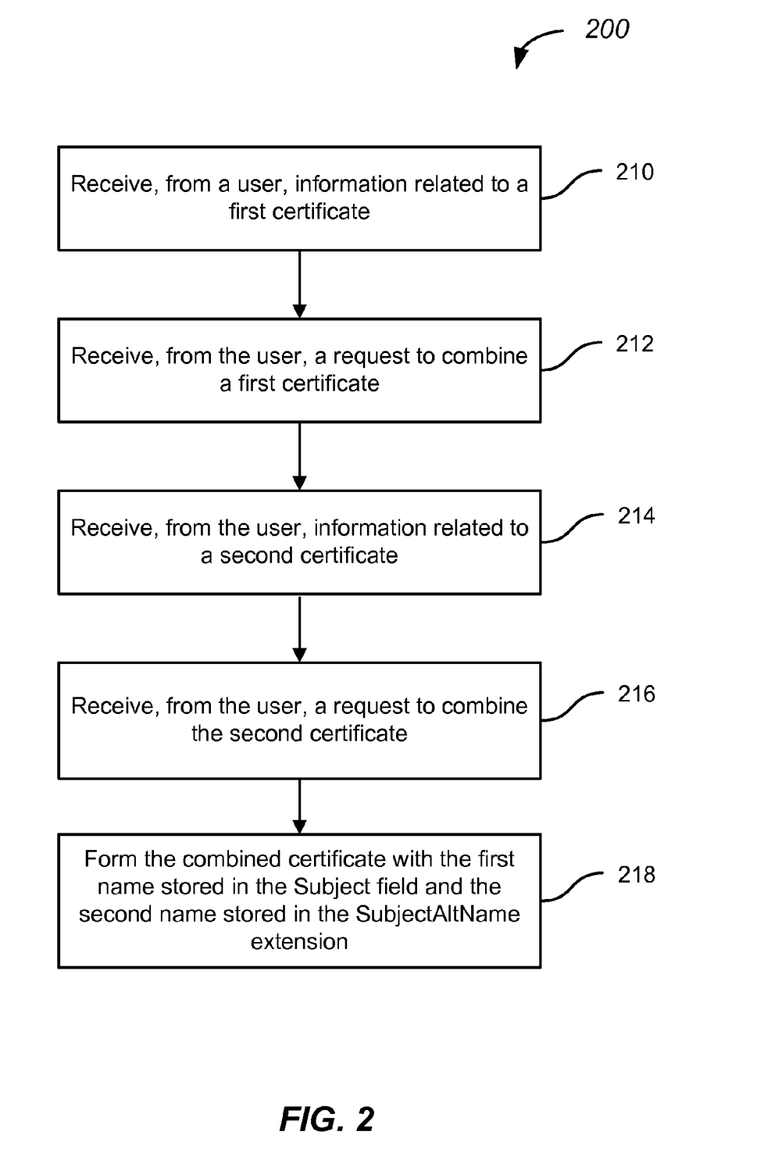
FIG. 2 is a simplified flowchart of a method of combining multiple digital certificates to form a combined digital certificate according to an embodiment of the present invention.

FIG. 2 is a simplified flowchart of a method of combining multiple digital certificates to form a combined digital certificate according to an embodiment of the present invention.

As illustrated in FIG. 2, a CA that has provisioned multiple certificates to a single user (where each certificate contains only one name) can offer that user a "Combine" feature. The user can indicate multiple certificates that the user desires to combine into a single combined certificate. The user selects one of the certificates as the "master" certificate. The name stored in the Subject field of the master certificate will be stored in the Subject field of the combined certificate and the one or more names from the other certificates will be stored in the SubjectAltName extension of the combined certificate. The public key for the combined certificate will be extracted from the master certificate. Since the user has already been approved to possess certificates that include all the names, the CA can immediately issue the new combined certificate. The methods described herein are applicable to digital certificates complying with RFC 5280, for example, X.509 certificates.

The method 200 of combining a first digital certificate and a second digital certificate into a combined certificate includes receiving, from a user, information related to the first certificate (210). The first certificate has a Subject field including a first name (e.g., the common name of the subject field includes the domain name associated with a website). The user submits a request to combine the first certificate into the combined certificate (212). In an embodiment, a user interface is provided at the CA's website to enable an applicant to enter the information and requests discussed in relation to FIG. 2. The request to form the combined certificate using information related to the first certificate may be made prior to submission of the information. For example, a list of services could be offered to the user that includes the "Combine" feature. When a user selects the "Combine" feature, a new window could then be displayed that would provide a user interface to enter the information related to the first certificate. One of ordinary skill in the art would recognize many variations, modifications, and alternatives.

The method also includes receiving information from the user related to the second certificate (214). Typically, the second certificate has a Subject field including a second name. Similar to the first certificate, the second name can be a domain name associated with a website stored as the common name in the Subject field. Alternatively, the second name could be stored in the SubjectAltName extension of the second certificate. It should be noted that the first name could be stored in the SubjectAltName extension of the first certificate. The user submits a request to combine the second certificate into the combined certificate (216). In one embodiment, the requests to combine the first certificate and the second certificate can be performed as a single action when the user selects the "Combine" feature offered by the CA. Thus, although steps 212 and 216 are illustrated as separate steps in FIG. 2, they could be performed by the user taking a single action.

The CA forms the combined certificate (218). The first name is stored in the Subject field of the combined certificate and the second name is stored in the SubjectAltName extension of the combined certificate. In an alternative embodiment, additional certificates can be combined into the combined certificate. For example, a third certificate could be combined into the combined certificate with a third name from the third certificate stored in the SubjectAltName extension of the combined certificate. Typically, the public key of the first certificate will be used as the public key of the combined certificate.

In this example of a combined certificate based on three original certificates, the combined certificate could be formed as part of an enrollment process in which all three names are submitted by the user prior to formation of the combined certificate. Alternatively, the combined certificate could be an updated certificate based on an initial combined certificate to which additional names (e.g., the third name) are added. Since the SubjectAltName extension provides for storage of multiple names, three or more certificates can be combined with the additional names stored in the SubjectAltName extension along with the second name. One of ordinary skill in the art would recognize many variations, modifications, and alternatives.

CAs implementing embodiments of the present invention will be able to offer users the ability to combine names from multiple certificates into one certificate. An advantage of such a combined certificate is that a single certificate and associated private key pair is easier to manage than multiple certificates and their associated private keys. The combined certificate can be used on any server whose name is in the certificate—the user doesn't have to keep track of which certificate belongs on which server. The user is able to determine which name is stored in the Subject field and which name(s) are stored in the SubjectAltName extension of the combined certificate. Thus, the applicant is provided with a significant level of control and convenience using embodiments of the present invention.

It should be appreciated that the specific steps illustrated in FIG. 2 provide a particular method of combining multiple digital certificates to form a combined digital certificate according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

As an alternative implementation of the method illustrated in FIG. 2, if the certificate selected by the user as the "master" certificate does not contain a name in the Subject field, but only a single SubjectAltName value (i.e., a single name in the SubjectAltName extension), the SubjectAltName value will be used to populate the Subject field of the combined certificate. As another alternative implementation, if any of the certificates selected for combination already contain multiple names stored in the SubjectAltName extension (e.g., the "master" or first certificate already contains multiple names stored in the SubjectAltName extension), one or more of these names can be added as names stored in the combined certificate. The user interface could, therefore, provide locations for entry of information related to the certificates and the names present in the certificate could be extracted and displayed for selection by the user. Once information on all the certificates to be combined is entered, the various names could be extracted and presented as a listing, enabling the user to select a name for inclusion in the Subject field with the remaining names stored in the SubjectAltName extension.

Figure 3:
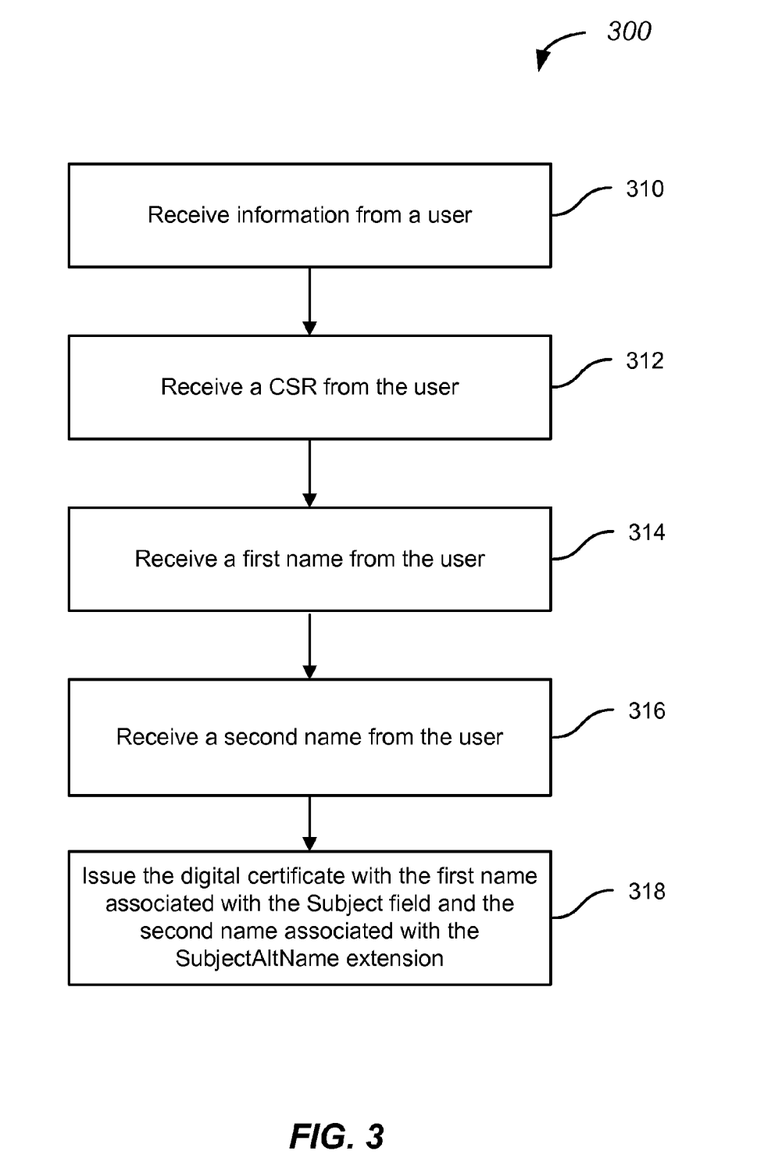
FIG. 3 is a simplified flowchart of a certificate provisioning process according to an embodiment of the present invention.

FIG. 3 is a simplified flowchart of a certificate provisioning process according to an embodiment of the present invention. The method 300 of forming a combined digital certificate includes receiving information from a user (310). The information typically includes contact information and billing information as discussed in relation to FIG. 1. The method also includes receiving a CSR for the combined digital certificate from the applicant/user (312). In this embodiment of provisioning a combined certificate from multiple certificates selected by the applicant, the applicant does not choose a "master" certificate. Rather, the user submits a new CSR to the CA and the CA takes the public key from the new CSR and uses this public key as the public key of the combined certificate. In this embodiment, after the applicant submits the CSR to provide the public key of the combined certificate, the applicant chooses a number of existing certificates from which all the names will be extracted and listed for the user to choose as described below.

The method also includes receiving a first name for use with the combined digital certificate (314) and receiving a second name for use with the combined digital certificate (316). The first name can be included in the CSR, for example, as the common name of the CSR. Additionally, the first name and/or the second name can be entered by a user through a suitable user interface. The combined digital certificate is then issued with the first name carried in the common name of the Subject field of the combined digital certificate and the second name carried in the SubjectAltName extension of the combined digital certificate (318). In an embodiment, the user can provide information about a vendor of web server software, either through a data entry screen or by selecting from a list of vendors. Moreover, the user can enter a service period that will be associated with the combined digital certificate.

In the embodiment illustrated in FIG. 3, the user decides, by providing one name as a first name and another name as a second name, which name will be stored in the Subject field (e.g., as the common name) of the combined certificate. Other names associated with the combined digital certificate will be stored in the SubjectAltName extension.

It should be appreciated that the specific steps illustrated in FIG. 3 provide a particular method of performing a certificate provisioning process according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
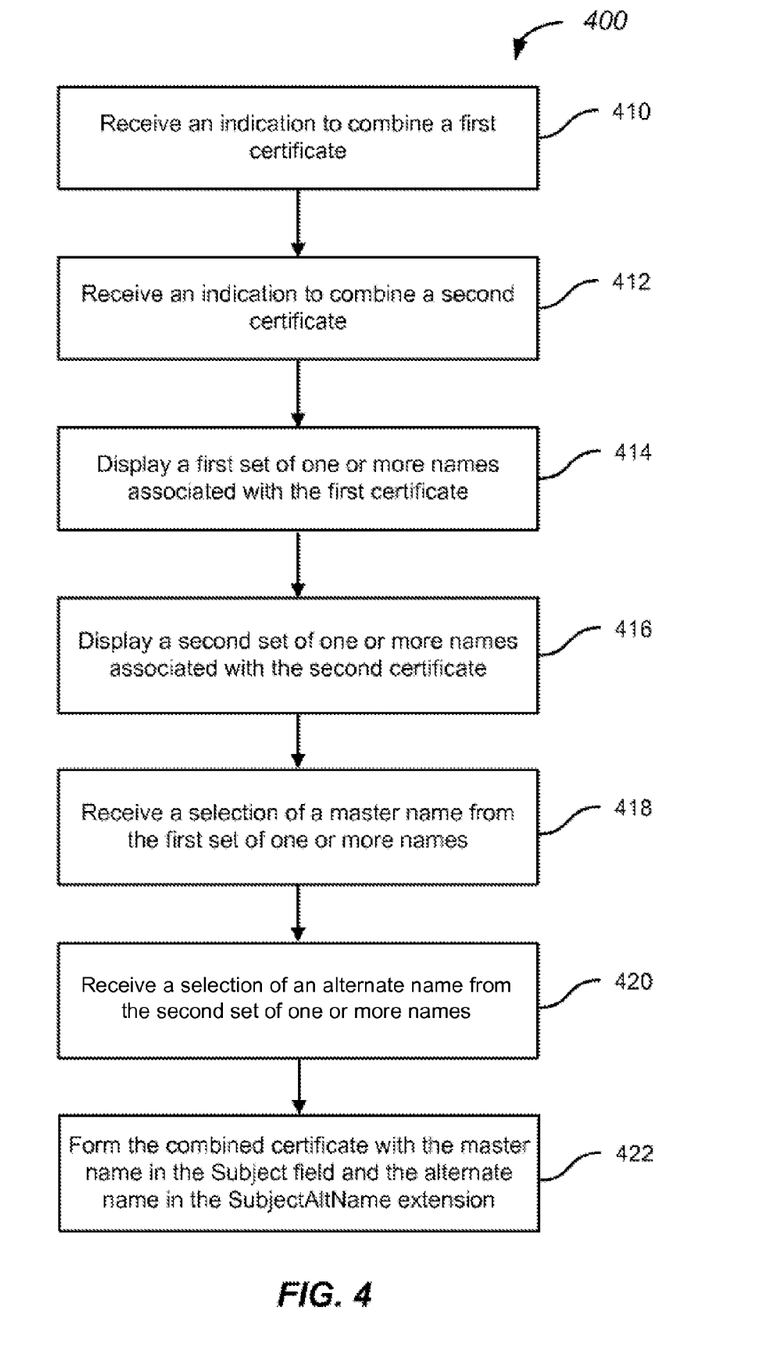
FIG. 4 is a simplified flowchart of a method of combining multiple digital certificates to form a combined digital certificate according to another embodiment of the present invention.

FIG. 4 is a simplified flowchart of a method of combining multiple digital certificates to form a combined digital certificate according to another embodiment of the present invention. In the embodiment illustrated in FIG. 4, the user indicates several certificates that are to be combined. The user is then presented with all the names carried in the Subject fields (e.g., the common names) of the various certificates and all of the names carried in the SubjectAltName extensions of the various certificates. Given the list of names, the user is able to choose the names that will be included in the combined certificate, and which of those names will appear in the Subject field, for example, as the common name.

The method of combining a plurality of digital certificates into a combined certificate 400 includes receiving an indication to combine a first certificate (410) and receiving an indication to combine a second certificate (412). The indication to combine the first and second certificates can be received by the user entering certificate information into a data entry screen, listing certificates in response to a query from the certificate combination system, or the like. Additionally, the user can indicate an intent to combine more than two certificates into the combined certificate, for example, three, four, or more certificates.

A first set of one or more names associated with the Subject field or the SubjectAltName extension of the first certificate is displayed (414). If the first certificate has a single name stored in the Subject field, this the first set will consist of a single name. As an example, the name could be a domain name of a website. If one or more names are stored in the SubjectAltName extension (e.g., additional domain names for other websites), then these names will also be displayed as part of the first set. A second set of one or more names associated with the Subject field or the SubjectAltName extension of the second certificate is displayed (416). As with the first certificate, the various names stored in the second certificate will be displayed as the second set. If the user indicates an intent to combine a third certificate into the combined certificate, then a third set of one or more names carried in either the Subject field or the SubjectAltName extension of the third certificate will be displayed.

A selection of a master name from the first set of one or more names is received (418). Additionally, a selection of an alternate name from at least one of the first set of one or more names or the second set of one or more names is received (420). Thus, the alternate name can be selected from either the first set or the second set. The alternate name can be "selected" by default if there is only a single name in the first certificate and a single name in the second certificate. One of ordinary skill in the art would recognize many variations, modifications, and alternatives.

The combined certificate is formed with the master name in the Subject field of the combined certificate and the alternate name in the SubjectAltName extension of the combined certificate (422). If a third certificate is combined into the combined certificate, then one or more names from the third set of one or more names can be stored in the SubjectAltName extension of the combined certificate. In an embodiment, the public key of the first certificate is used as the public key of the combined certificate. In other embodiments, the public key of the second certificate is used as the public key of the combined certificate. Thus, users have a great level of flexibility in defining the characteristics of the combined certificate. One of ordinary skill in the art would recognize many variations, modifications, and alternatives.

It should be appreciated that the specific steps illustrated in FIG. 4 provide a particular method of combining multiple digital certificates to form a combined digital certificate according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Because embodiments of the present invention allow a CA to offer several different ways to choose the name carried in the Subject field and the public key used for the combined certificate, purchasers have a significant amount of flexibility in defining the components of the combined certificate.

Figure 5:
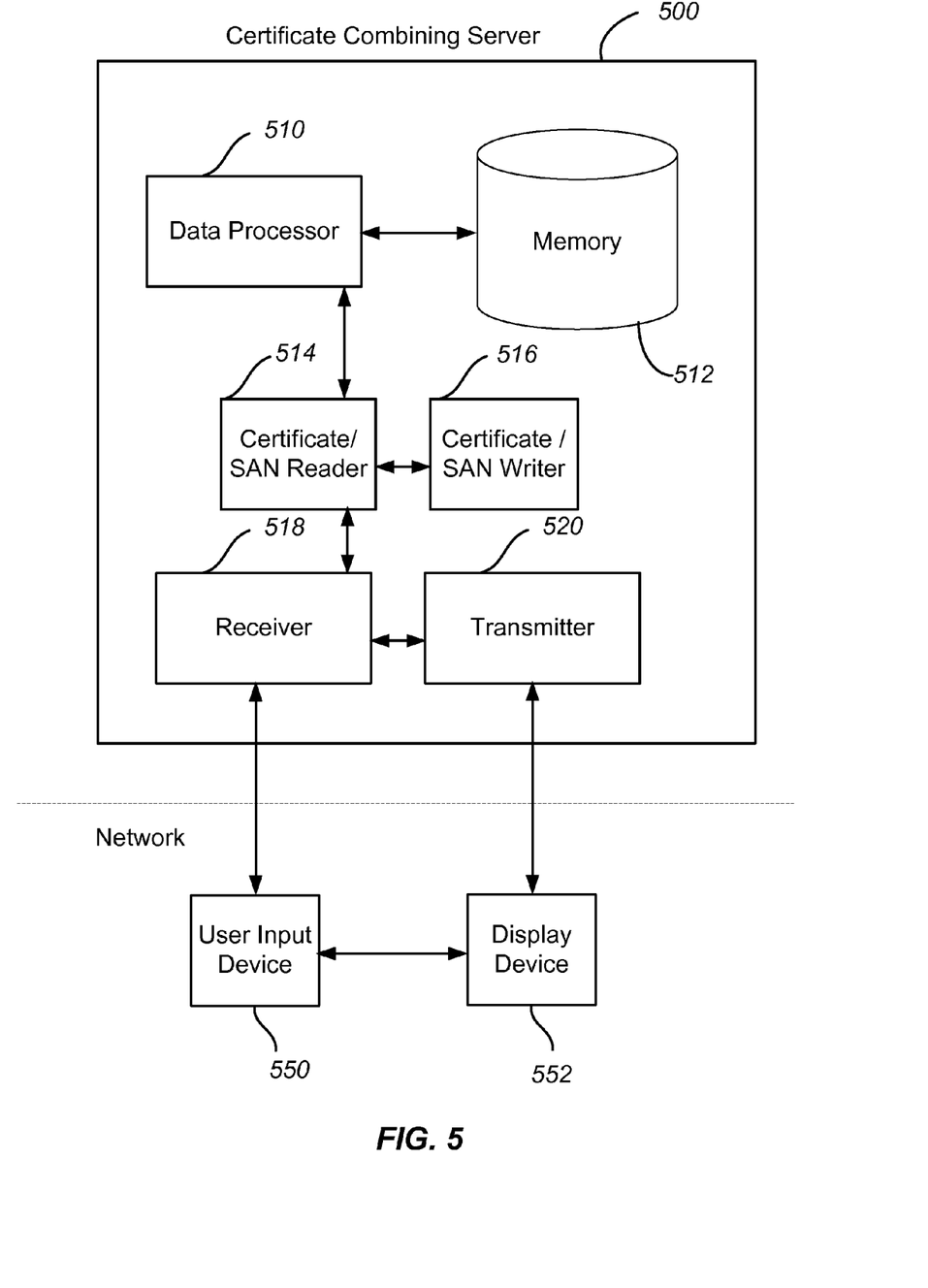
FIG. 5 is a simplified schematic diagram of a system for combining multiple digital certificates according to an embodiment of the present invention.

FIG. 5 is a simplified schematic diagram of a system for combining multiple digital certificates according to an embodiment of the present invention. The certificate combining server 500 includes a processor 510 (also referred to as a data processor) and a memory 512. The processor 510 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The processor 510 is coupled to the memory 512 in order to store and access stored information for use during operation of the certificate combining server. The memory 512 (also referred to as a database or a computer readable medium) can be local or distributed as appropriate to the particular application. Memory 512 may include a number of memories including a main random access memory (RAM) for storage of instructions and data during program execution and a read only memory (ROM) in which fixed instructions are stored. Thus, memory 512 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The certificate combining server 500 also includes a receiver 518 and a transmitter 520. The receiver 518 and the transmitter 520 are operable to interact with a user input device 550 and a display device 552 over a network. The network can be the Internet or other network suitable for the communication of data and commands. Thus, a user is able, through a user interface interacting with the user input device 550 and the display device 552 to submit certificates for combination, indicate a name to be used as a "master" name for the combined certificate, submit CSRs, select names to be included in the SubjectAltName extension of the combined certificate, and other functions described throughout the specification. The user input device 550 and the display device 552 can be components of a personal computer, a web application, or the like. Typically, the user will interact with the certificate combining server 500 using one or more graphical user interfaces (GUIs) receiving input through user input device 550 and displaying output through display device 552.

The certificate combining server 500 also includes a certificate reader 514 and a certificate writer 516. The certificate reader 514 is used to parse the certificate and provide information used in provisioning of certificates. As an example, the certificate reader 514 is used to determine one or more names stored in a certificate for use in displaying such names as discussed in relation to step 414 illustrated in FIG. 4. The certificate writer is used to provision the new combined certificate as discussed in relation to step 422 illustrated in FIG. 4 as well as other provisioning methods described herein.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for combining a first certificate and a second certificate into a combined certificate, the method comprising:
   receiving, at a certificate combining server, information from a user related to the first certificate having a Subject field including a first name;
   receiving, at the certificate combining server, a request from the user to combine the first certificate into the combined certificate;
   receiving, at the certificate combining server, information from the user related to the second certificate having a Subject field including a second name;
   receiving, at the certificate combining server, a request from the user to combine the second certificate into the combined certificate; and
   forming, at the certificate combining server, the combined certificate, wherein the first name is stored in the Subject field of the combined certificate and the second name is stored in a SubjectAltName extension of the combined certificate.

2. The method of claim 1 wherein a public key of the combined certificate comprises a public key of the first certificate.

3. The method of claim 1 wherein the combined certificate complies with RFC 5280.

4. The method of claim 3 wherein the combined certificate is a X.509 certificate, version 3 or version newer than 3 that provides the SubjectAltName extension.

5. The method of claim 1 wherein the first name is the common name of the Subject field.

6. The method of claim 1 further comprising:
   receiving an indication from the user to combine a third certificate, wherein the third certificate includes a third name stored in a Subject field of the third certificate; and
   updating the combined certificate, wherein the third name is also stored in the SubjectAltName extension of the combined certificate.

7. The method of claim 6 wherein the first name comprises a domain name and the second name comprises a domain name.

8. A computer-implemented method of combining a plurality of digital certificates into a combined certificate, the method comprising:
   receiving, at a certificate combining server, an indication to combine a first certificate;
   receiving, at the certificate combining server, an indication to combine a second certificate;
   providing, from the certificate combining server for display on a display device, a first set of one or more names associated with the Subject field or the SubjectAltName extension of the first certificate;
   providing, from the certificate combining server for display on the display device, a second set of one or more names associated with the Subject field or the SubjectAltName extension of the second certificate;

receiving, at the certificate combining server, a selection of a master name from the first set of one or more names;

receiving, at the certificate combining server, a selection of an alternate name from at least one of the first set of one or more names or the second set of one or more names;

forming, at the certificate combining server, the combined certificate with the master name in the Subject field of the combined certificate and the alternate name in the SubjectAltName extension of the combined certificate.

9. The method of claim 8 wherein the indication to combine the first certificate is received from a user.

10. The method of claim 9 wherein the indication to combine the second certificate is received from the user.

11. The method of claim 8 wherein the first set of one or more names includes a domain name carried in the Subject field of the first certificate.

12. The method of claim 8 wherein the first set of one or more names includes a domain name carried in the SubjectAltName extension of the first certificate.

13. The method of claim 8 wherein the second set of one or more names includes a domain name carried in the Subject field of the second certificate.

14. The method of claim 8 wherein the second set of one or more names includes a domain name carried in the SubjectAltName extension of the second certificate.

15. The method of claim 8 further comprising:

receiving, at the certificate combining server, an indication to combine a third certificate;

providing, from the certificate combining server for display on the display device, a third set of one or more names associated with the Subject field or the SubjectAltName extension of the third certificate, wherein forming the combined certificate comprises forming the combined certificate with one or more of the third set of one or more names in the SubjectAltName extension of the combined certificate in addition to the alternate name.

16. The method of claim 8 wherein a public key of the combined certificate comprises a public key of the first certificate.

* * * * *